June 23, 1942. W. B. CLAYTON 2,287,750
FILL PIPE CAP
Filed Oct. 30, 1939
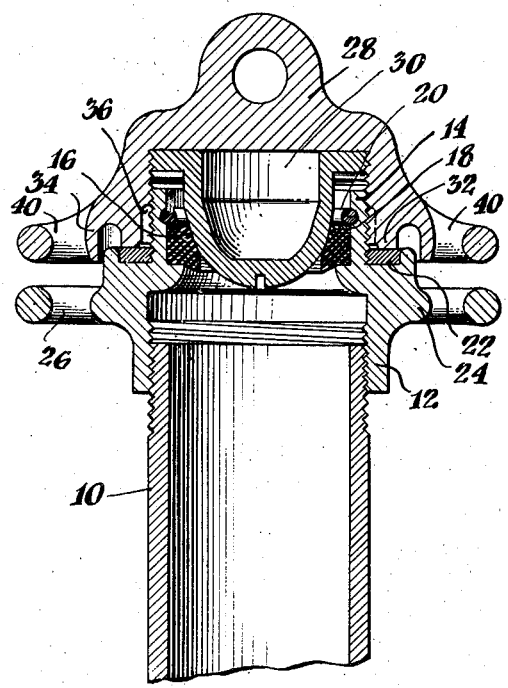
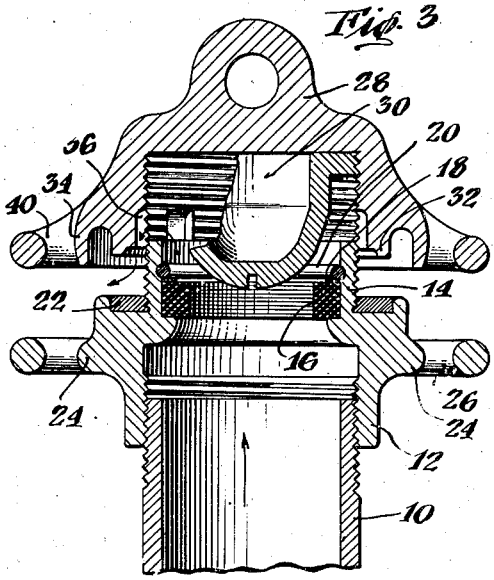
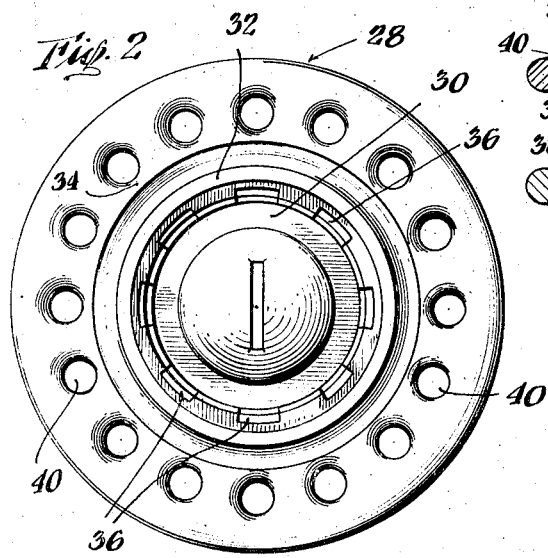
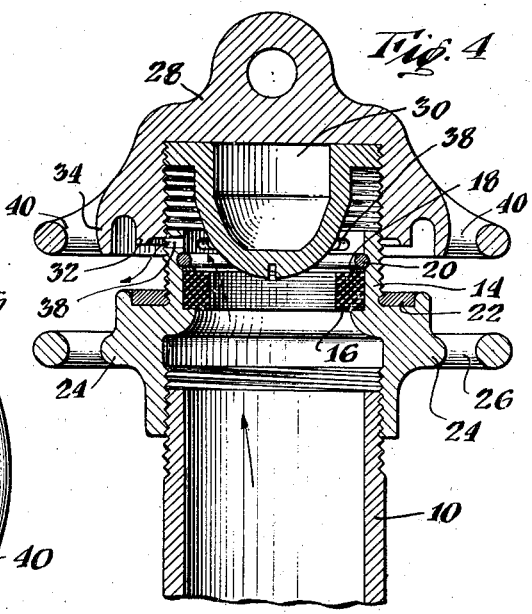
INVENTOR
William B. Clayton
BY
his ATTORNEY Patented June 23, 1942

2,287,750

UNITED STATES PATENT OFFICE 2,287,750

FILL PIPE CAP

William B. Clayton, Waco, Tex.

Application October 30, 1939, Serial No. 301,875

3 Claims. (Cl. 220—29)

This invention relates to a cap or closure for tanks or the like, in which a moderate degree of pressure may accumulate and which is to be resisted by such cap. For example, in modern practice, tanks used for the storage of petroleum products are now being provided with vent pipes having valves which will prevent the escape of vapors until a substantial pressure (which may range from an ounce or two up to five pounds or more) has been reached. Obviously, if such tanks are to hold such pressures as this, the filling pipes must be carefully capped.

The essential features of the cap of my invention comprise two separate sealing or seating surfaces in addition to the screw threads which hold the cap in place. One of these seating surfaces comprises a resilient member and the sides of this seating surface on any vertical section form an acute angle with the axis of the pipe so that substantial but impositive sealing is obtained. The other seating surface (preferably arranged outside of the first one with the screw connection between) is substantially transverse the axis of the pipe so that positive sealing can be obtained. By this arrangement, the first or impositive sealing will act to withhold the principal movement of vapors through the cap and thus permit the use of materials at the positive seal which might be deteriorated or injured by the action of the vapors.

In conjunction with the double seal described, I also preferably include venting means so that pressure can be released through the cap while the threads of the cap are still engaged with the pipe. This is accomplished by providing a break in one of the threaded members forming the union between the pipe member and cap member.

This invention can readily be understood from the illustrative example shown in the accompanying drawing, in which Fig. 1 is a section through the pipe carrying the cap of my invention, with the cap screwed tightly into closed position; Fig. 2 is a bottom elevation of the cap removed from the pipe; Fig. 3 is a section similar to Fig. 1 with the cap unscrewed into venting position, and Fig. 4 is a modified construction also shown in venting position.

Actually, the structure to which my invention relates comprises two members, one of which is intended to be screwed permanently onto the pipe to form a seat and the other is the cap proper which cooperates with the seat member. In the drawing, 10 designates the pipe on which is screwed the seat member 12. This seat member has a portion 14 which is externally threaded to receive the cap and inside of this portion is placed a gasket or washer 16 made of compressible material such as the petroleum-resistant synthetic rubbers now available on the market, or a cork composition or other equivalent body. Gasket 16 may be held in place by metal washer 18 and a split ring 20.

Adjacent the bottom of the portion 14 and outside of it is a recess holding the washer 22. This washer may, for example, be made of a fibrous material such as leather. By seating this washer in a recess, its spreading or distortion under pressure is prevented. The seat member 12 preferably is made of brass and if desired it can be provided with an outer flange 24 carrying holes or loops 26 through which a padlock can be inserted to hold the cap in place.

The main body of the cap 28 ordinarily will be made of iron and is threaded internally to cooperate with the threaded portion 14 of the seat member. Screwed into the cap in the same threads is a round-nosed extension member 30 which is preferably made of brass. As shown in Fig. 1, the member 30 contacts with the washer 16 and the contact surface between the washer and the member 30 is such that the line of contact as indicated in a section such as shown in Fig. 1 forms an acute angle with the axis of the pipe 10. This means that a substantial sealing is effected over a substantial range of position of the cap 28, though of course the sealing is somewhat impositive, due to the resiliency of the washer 16. However, this seal will be substantially tight when the cap is screwed all the way down. A ring 32 is formed on the cap 28 so as to contact with the washer 22 and form a positive seal when the cap 28 is screwed down tight. An outer guard ring 34 is preferably supplied to protect the washer 22 from rain and dirt.

The venting of the pipe while the threads of the cap 28 still engage the threads of the seat 12 can be accomplished either by having a series of ports or openings such as indicated at 36 formed in the threaded portion of the cap, or ports may be formed through the threaded portion 14 of the seat 12 as indicated at 38 in Fig. 4. Either of these constructions permits vapor pressure to escape between the threaded members while the latter are still engaged, after the two seals have been opened.

The cap member 28 preferably is provided with a series of holes 40 which cooperate with the loops 26 for locking the cap in place.

In operation, I find that the inner seal formed by the cooperation of round-nosed member 30 with washer 16 will remain closed through at least one and sometimes two full revolutions of the cap. This means that there will be a substantial seal even if a workman neglects to screw the cap down firmly; and even if there is some movement of the cap by expansion and contraction due to temperature changes, this will not cause the seals to open. In ordinary course, a leather washer is employed for the seal, which may be placed either outside or inside the threads. In the latter case, gasoline vapor tends to harden and shrink the leather and the washer soon deteriorates and cracks, making a positive seal impossible. In my construction, this leather washer is protected from the action of vapors both by the inner seal and by the threads. In addition, the ring or flange 34 protects the washer from the weather which usually affects washers placed on the outside and the recess in which the washer is placed tends to keep it in proper shape and position. As a result, this seal will withstand substantial pressures and will continue to hold such pressures over a long period of time without the necessity of having the washers renewed. It is obvious that due to the fact that the inner seal is impositive it does not in any way interfere with the positive closing of the outer seal.

The cap of my invention is primarily intended for use on tanks intended to develop internal pressure. Its use is not restricted to this purpose, for it may be employed in any case where a tight seal is necessary. It is also to be understood that the details of construction may be changed in many particulars without departing from the spirit of my invention.

What I claim is:

1. A pipe closure comprising a seat member adapted to be screwed onto a pipe, having a threaded portion to receive a cap and having a resilient washer inside of said threaded portion and a fibrous washer outside of said threaded portion, a cap adapted to be screwed onto said seat member, having a rigid internal projection adapted to contact with said resilient washer at an acute angle to the axis of the pipe so that contact between said rigid projection and said resilient washer will be maintained throughout a substantial axial movement of said cap and having a ring adapted to contact with said fibrous washer on a line substantially transverse the axis of the pipe, whereby said fibrous washer may be positively compressed while contact is being maintained between said rigid projection and said resilient washer to the end that a closure will be had comprising two lines of contact with an entirely enclosed space between them.

2. A structure as specified in claim 1 in which the said cap has an overhanging ring to cover said fibrous washer and protect the same from the weather.

3. A structure as specified in claim 1 which further includes ports interrupting the threads on said seat member whereby fluids may pass through the device while the threads of the two members are engaged after the cap has lost contact with the fibrous washer and after it is no longer exerting substantial pressure against said resilient washer.

WILLIAM B. CLAYTON.